US009451518B2

(12) United States Patent
Lee et al.

(10) Patent No.: US 9,451,518 B2
(45) Date of Patent: Sep. 20, 2016

(54) CHANNEL MANAGEMENT IN A WI-FI DEVICE IN A MULTI-CHANNEL CONCURRENT ENVIRONMENT

(71) Applicant: QUALCOMM Incorporated, San Diego, CA (US)

(72) Inventors: Hoon Ki Lee, San Jose, CA (US); Dinesh K. Upadhyay, San Jose, CA (US); Ashok Ranganath, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 170 days.

(21) Appl. No.: 13/791,664

(22) Filed: Mar. 8, 2013

(65) Prior Publication Data

US 2014/0254549 A1  Sep. 11, 2014

(51) Int. Cl.
*H04W 36/24* (2009.01)
*H04W 88/06* (2009.01)

(52) U.S. Cl.
CPC ............. *H04W 36/24* (2013.01); *H04W 88/06* (2013.01)

(58) Field of Classification Search
None
See application file for complete search history.

(56) References Cited

U.S. PATENT DOCUMENTS

| 7,352,728 | B2 * | 4/2008 | Soomro ........................ 370/338 |
| 8,107,413 | B2 | 1/2012 | Lee et al. |
| 8,228,790 | B2 | 7/2012 | Kitchin |
| 2004/0146022 | A1 * | 7/2004 | Lewis et al. ................... 370/331 |
| 2005/0128982 | A1 * | 6/2005 | Kitchin ........................ 370/332 |
| 2006/0187873 | A1 * | 8/2006 | Friday et al. ................. 370/328 |
| 2006/0198337 | A1 * | 9/2006 | Hoang ................... H04W 16/14 370/329 |
| 2008/0002633 | A1 * | 1/2008 | Pandey et al. ................. 370/338 |
| 2010/0103850 | A1 * | 4/2010 | Gossain et al. ............... 370/312 |
| 2011/0038273 | A1 * | 2/2011 | Li et al. ........................ 370/252 |
| 2011/0235559 | A1 | 9/2011 | Sakoda |
| 2012/0120904 | A1 | 5/2012 | Seok et al. |
| 2012/0163349 | A1 | 6/2012 | Fontaine et al. |
| 2014/0079043 | A1 * | 3/2014 | Montemurro ..... H04W 52/0216 370/338 |

* cited by examiner

*Primary Examiner* — Donald Mills
(74) *Attorney, Agent, or Firm* — Muncy, Geissler, Olds & Lowe, P.C.

(57) ABSTRACT

A multi-channel wireless device for participating on a plurality of networks. The wireless device switches from a first channel associated with a first network to a second channel associated with a second network if the wireless device has a channel dwell time on the first channel equal to or greater than a maximum channel allowance time interval for the first channel, wherein the maximum channel allowance time interval for the first channel is given by a channel switching time subtracted from a Beacon interval associated with the first network divided by the total number of networks that the wireless device is participating with.

28 Claims, 7 Drawing Sheets

CHANNEL MANAGEMENT IN A WI-FI DEVICE IN A MULTI-CHANNEL CONCURRENT ENVIRONMENT

FIELD OF DISCLOSURE

The present invention relates to wireless communication, and more particularly, to a Wi-Fi device participating on more than one network.

BACKGROUND

Some Wi-Fi wireless devices are capable of participating on more than one wireless network. For example, one may configure a peer-to-peer network on a first channel to share files from a desktop to a laptop, and may also configure the laptop to participate in another wireless network on a second channel so that it can obtain an Internet connection by way of an access point. Each network has its own set of Beacon frames, and it is important for the laptop to receive Beacon frames over each channel by switching between channels. However, it is important that the protocol for switching from one channel to another be such that there is a fair allocation of time among the channels.

SUMMARY

Embodiments of the invention are directed to systems and method for channel management in a Wi-Fi device in a multi-channel concurrent environment.

In one embodiment, a method for a wireless device to switch from a first channel associated with a first network to a second channel associated with a second network in an environment of N total networks. The method comprises switching the wireless device from the first channel to the second channel when the wireless device has operated on the first channel for a length of time equal to or greater than a first maximum channel allowance time interval, wherein the first maximum channel allowance time interval is given by a channel switching time subtracted from a first Beacon interval associated with the first network divided by N.

In another embodiment, a wireless device comprises a radio frequency circuit to operate on a first channel associated with a first network and a second channel associated with a second network in an environment of N total networks. A processor in the wireless device runs and resets a counter, where the processor resets the counter when causing the radio frequency circuit to switch channels. The processor switches the radio frequency circuit from the first channel to the second channel when the counter indicates that the radio frequency circuit has operated on the first channel for a length of time equal to or greater than a first maximum channel allowance time interval, wherein the first maximum channel allowance time interval is given by a channel switching time subtracted from a first Beacon interval associated with the first network divided by N.

In another embodiment, a wireless device comprises a radio frequency circuit to operate on a first channel associated with a first network and a second channel associated with a second network in an environment of N total networks; a means for counting; and a means for controlling to run and reset the means for counting. The means for controlling resets the means for counting when causing the radio frequency circuit to switch channels. The means for controlling switches the radio frequency circuit from the first channel to the second channel when the means for counting indicates that the radio frequency circuit has operated on the first channel for a length of time equal to or greater than a first maximum channel allowance time interval, wherein the first maximum channel allowance time interval is given by a channel switching time subtracted from a first Beacon interval associated with the first network divided by N.

In another embodiment, a computer-readable non-transitory medium has stored instructions to cause a wireless device in an environment of N total networks to perform a method comprising switching from a first channel associated with a first network to a second channel associated with a second network when the wireless device has operated on the first channel for a length of time equal to or greater than a first maximum channel allowance time interval, wherein the first maximum channel allowance time interval is given by a channel switching time subtracted from a first Beacon interval associated with the first network divided by N.

BRIEF DESCRIPTION OF THE DRAWINGS

The accompanying drawings are presented to aid in the description of embodiments of the invention and are provided solely for illustration of the embodiments and not limitation thereof

DETAILED DESCRIPTION

Figure 1:
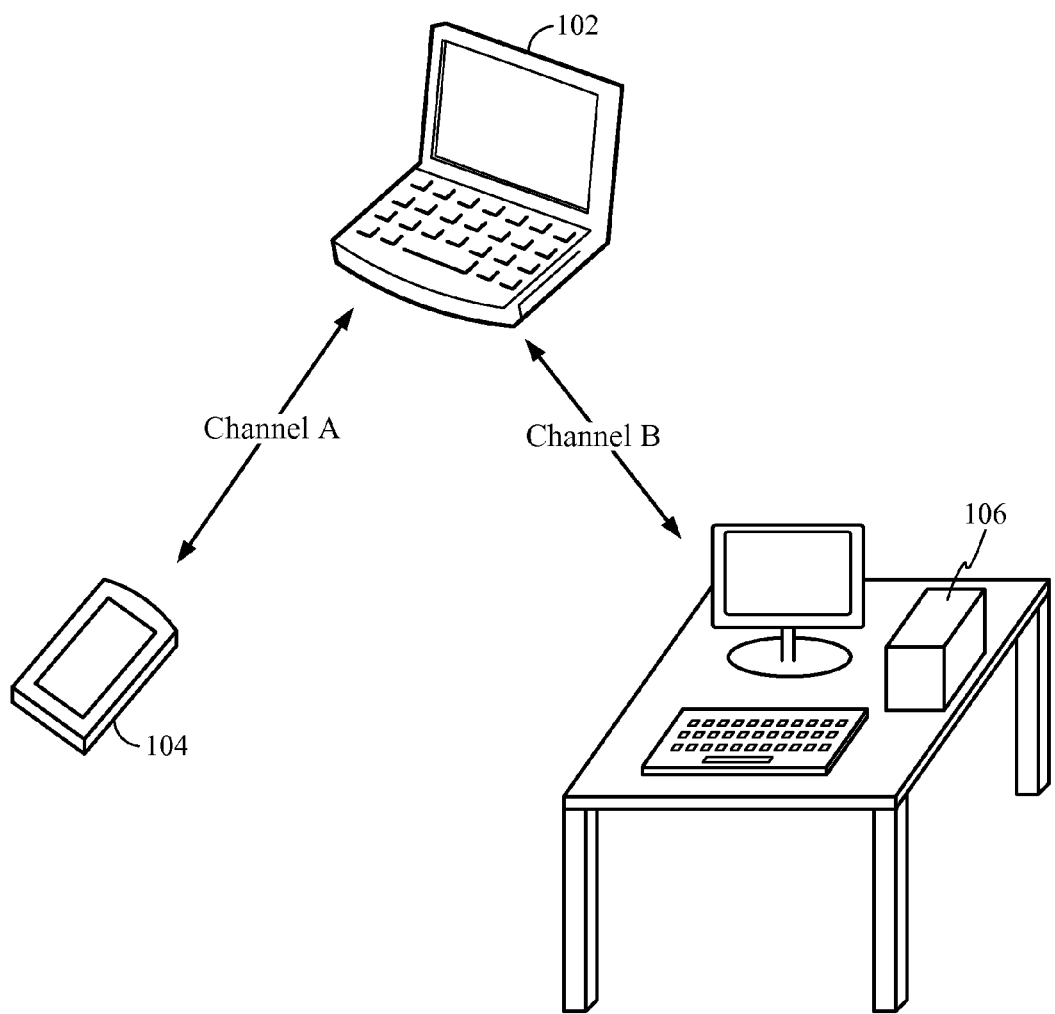
FIG. 1 illustrates a dual-channel wireless device participating in a Basic Service Set as a STA (station) and participating in another Basic Service Set as a Wi-Fi Direct Client.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A wireless device may be configured to participate in more than one Basic Service Set (BSS). For example, in FIG. 1, a dual-channel wireless device shown as Laptop 102 is configured as a STA (station) to communicate with Smartphone 104 over Channel A and with Computer 106 over Channel B. Smartphone 104 is configured as an Access Point (AP) to provide an Internet connection for Laptop 102, which may be viewed as a STA. In the particular example of FIG. 1, Computer 106 is configured as a node in a Wi-Fi Direct™ peer-to-peer network so as to exchange files with Laptop 102. (Wi-Fi Direct is a trademark of the Wi-Fi Alliance.) Laptop 102 and Smartphone 104 along with Channel A form part (or all) of a BSS, and Laptop 102 and Computer 106 along with Channel B form part (or all) of another BSS. Channel A operates at a different frequency channel than that of Channel B. Both BSS's, for example, may conform to one of the standards in the Institute of Electrical and Electronics Engineers (IEEE) 802.11 set of standards, such as Wi-Fi Direct or s-called P2P.

Laptop 102 transmits and receives on only one channel at a time, and consequently Laptop 102 needs to switch back and forth on channels A and B. For example, when leaving the BSS with Smartphone 104 as an AP to participate in the P2P (peer-to-peer or ad hoc network) with Computer 106, Laptop 102 may use a Wi-Fi Power Save Mode to indicate to Smartphone 104 not to transmit a frame when on Channel B. Smartphone 104 may indicate a pending (buffered) frame by using a Traffic Indication Map (TIM) Information Element (IE) in a Beacon frame. Consequently, it is important for Laptop 102 to receive Beacon frames in order not to delay receiving frames buffered at a node, such as Smartphone 104 or Computer 106.

Figure 2:
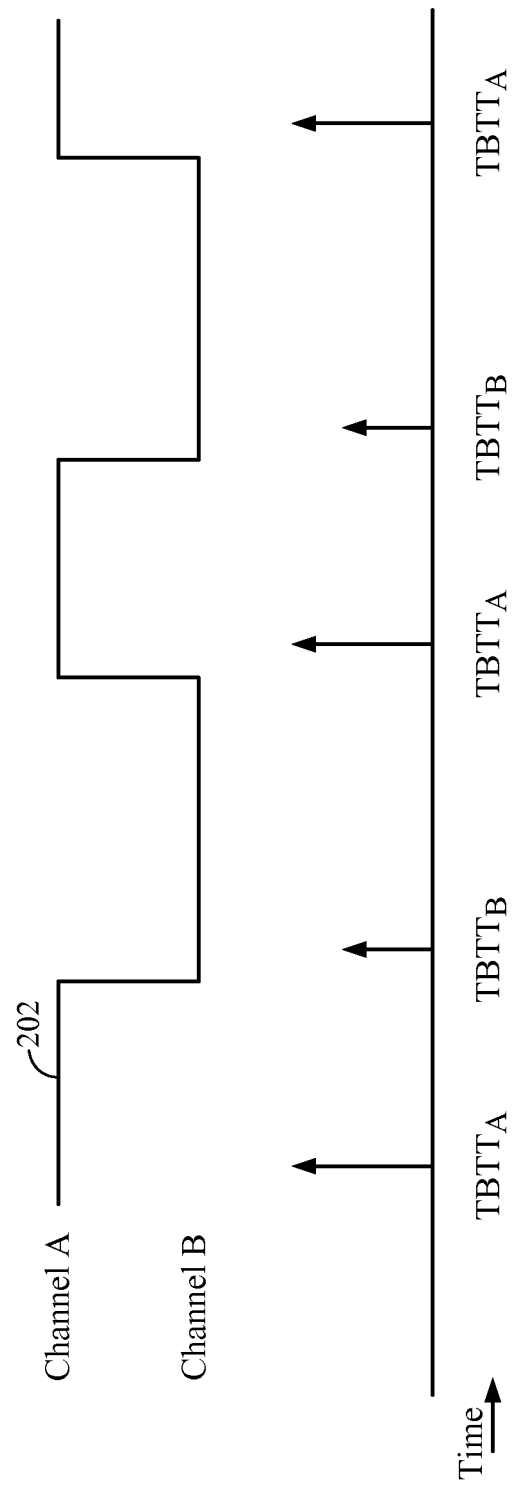
FIG. 2 illustrates a simple switching protocol for a dual-channel wireless device where the Beacon intervals are the same for each channel.

However, because the Timing Synchronization Function (TSF) counter for different networks, e.g., the networks of FIG. 1, are not synchronized, Beacon frames from different networks are not synchronized and their relative timing relationship is not known beforehand. For example, FIG. 2 illustrates a timing relationship in which the two networks for Channel A and Channel B have the same Beacon interval, the time between Beacon frames. The Target Beacon Transmissions Times (TBTT) for which Beacon frames are transmitted for Channel A are indicated in FIG. 2 as $TBTT_A$, and the TBTT for which Beacon frames are transmitted for Channel B are indicated in FIG. 2 as $TBTT_B$. The line 202 pictorially represents a wireless device (e.g., Laptop 102) switching from one channel to another, as indicated in FIG. 2.

FIG. 2 illustrates a simple switching protocol in which a dual-channel wireless device switches from Channel A to Channel B just before (to allow for channel switching time) the network associated with Channel B transmits a Beacon frame at a $TBTT_B$, and the wireless device switches from Channel B to Channel A just before the network associated with Channel A transmits a Beacon frame at a $TBTT_A$. In the particular example of FIG. 2, the Beacon interval is the same for both channels, but the time interval from a $TBTT_A$ to the immediately following $TBTT_B$ is less than the time interval from a $TBTT_B$ to the immediately following $TBTT_A$. As a result, for the simple switching protocol illustrated in FIG. 2, the device spends more time in Channel B than in Channel A.

Figure 3:
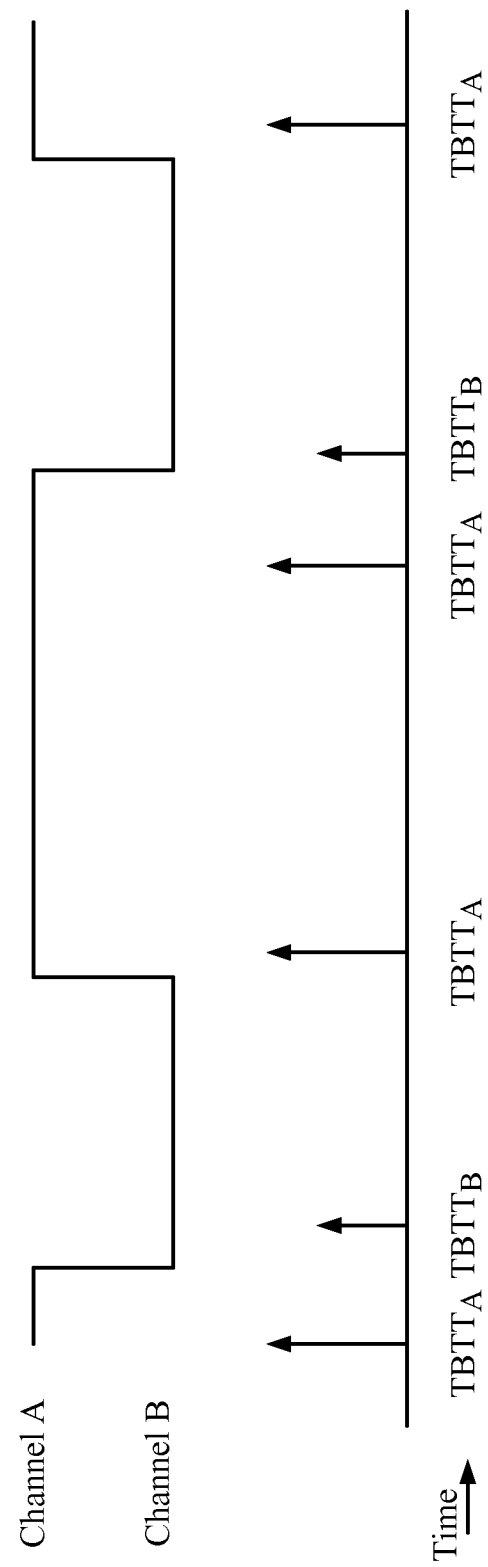
FIG. 3 illustrates the simple switching protocol of FIG. 2, but where the Beacon interval for one channel is twice that of the other channel.

FIG. 3 illustrates the simple switching protocol discussed above, but where now the Beacon interval for Channel B is twice that as the Beacon interval for Channel A. for the particular example illustrated in FIG. 3, note that the dual channel wireless device spends substantially more time in Channel A than in Channel B.

FIGS. 2 and 3 illustrate a disadvantage with a simple switching protocol where the wireless device may spend too much time in one particular channel. Embodiments described herein help to mitigate the disadvantage of a simple switching protocol by managing the channel allocation of a multi-channel environment in such a way that that a dual-channel (or more generally a multi-channel) wireless device will not spend an inordinate amount of time in any one particular channel.

The design goal of an embodiment is to not only ensure that a multi-channel wireless device switches to a particular channel just before the arrival of a beacon frame for that particular channel, but also to ensure the fairness of channel distribution across networks. To achieve this design goal, embodiments switch to the appropriate channel just before a corresponding beacon frame is to arrive, where switching overhead time is taken into account, and where there is a maximum channel allowance time for each channel. If a channel dwell time exceeds the maximum channel allowance time for that particular channel, then embodiments will cause the multi-channel wireless device to relinquish that particular channel and move to another channel.

Let Max_Ch denote the maximum channel allowance time interval for some channel, let N denote the number of channels (networks), let Beacon_Interval denote the Beacon interval for the channel, and let Switch_Time denote the time needed for the multi-channel wireless device to switch from one channel to another. Then embodiments provide the maximum channel allowance time interval such that $$\text{Max\_Ch} = \frac{\text{Beacon\_Interval}}{N} - \text{Switch\_Time}$$

Note that maximum channel allowance time interval decreases for decreasing Beacon interval time. In this way, by assigning a smaller maximum channel allowance time interval for smaller Beacon intervals, there is a greater chance that the multi-channel wireless device will be on an active channel, and the disadvantages of the simple protocol illustrated in FIGS. 2 and 3 are mitigated.

Figure 4:
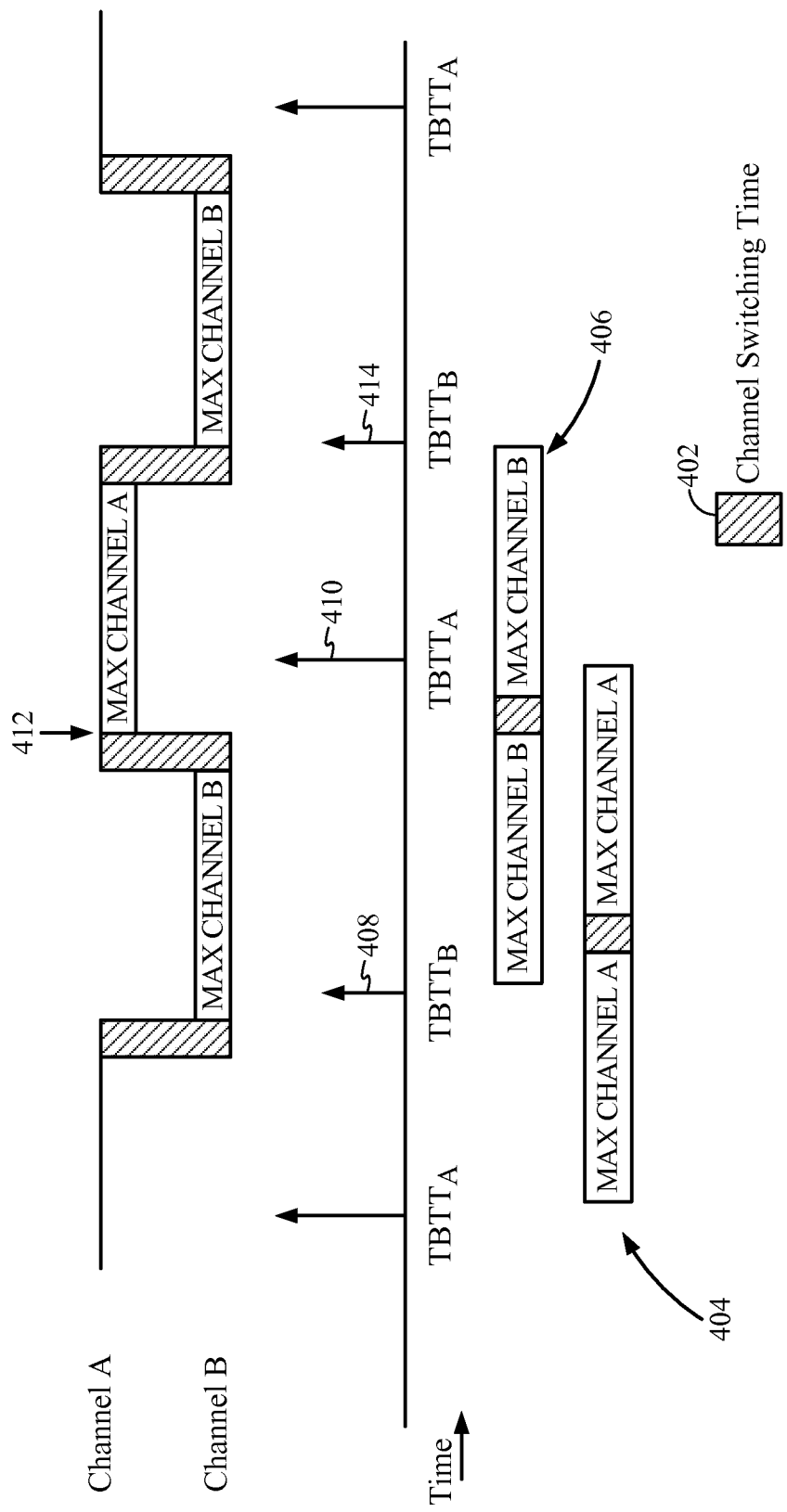
FIG. 4 illustrates a switching protocol according to an embodiment for a dual-channel wireless device where the Beacon interval for one channel is twice that of the other channel.

FIG. 4 illustrates a switching protocol according to an embodiment, where in the particular example of FIG. 4 the Beacon intervals for Channels A and B are equal to each other. The time length of the channel switching time is represented by rectangle 402. The length of time (see 404) represented by two maximum channel allowance time intervals for Channel A summed with the channel switching time is seen to equal the Beacon interval for Channel A. The length of time (see 406) represented by two maximum channel allowance time intervals for Channel B summed with the channel switching time is seen to equal the Beacon interval for Channel B.

Consider the time instance $TBTT_B$ labeled 408. The wireless device has just switched to Channel B in time to be active on Channel B when $TBTT_B$ 408 has arrived. But because the time difference between instances $TBTT_A$ 410 and $TBTT_B$ 408 is greater than the maximum channel allowance time interval for Channel B, the wireless device will switch from Channel B to Channel A (allowing for the channel switching time) indicated by the arrow labeled 412. Because the Beacon time intervals are equal to each other, so will be the maximum channel allowance time intervals for Channels A and B, and consequently for the particular example of FIG. 4 the wireless device will switch from Channel A back to Channel B at time instance $TBTT_B$ 414. The switching pattern will repeat, and thus the wireless device will spend equal time on each channel. This is to be compared to the case represented by FIG. 2.

Figure 5:
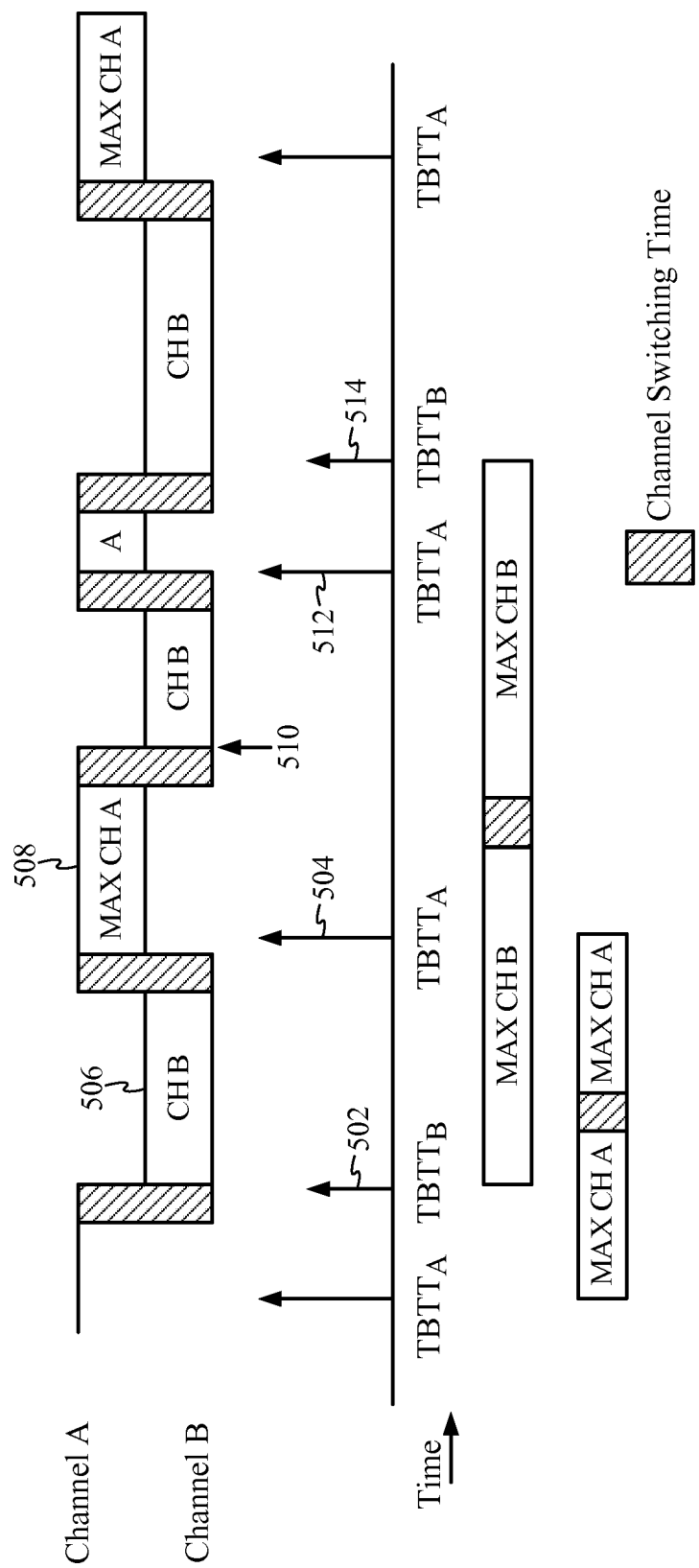
FIG. 5 illustrates a switching protocol according to an embodiment for a dual-channel wireless device where the Beacon interval for one channel is twice that of the other channel.

FIG. 5 illustrates a switching protocol according to an embodiment for a dual-channel wireless device where the Beacon interval for Channel B is twice that of Channel A. At time instance $TBTT_B$ 502, the wireless device switches from Channel A to Channel B. Note that the wireless device switches from Channel B to Channel A at time instance $TBTT_A$ 504 before the maximum channel allowance time interval for Channel B has been reached. This is the reason for labeling the time rectangle 506 as "CH B". However, the time rectangle 508 is labeled "MAX CH A" to indicate that the maximum channel allowance time interval for Channel A is reached while the wireless device is on Channel A after having switched from Channel B to Channel A at time instance $TBTT_A$ 504. The wireless device then switches to Channel B at the time instance represented by the arrow labeled 510. The wireless device switches from Channel B to Channel A at the time instance $TBTT_A$ 512 without having reached the maximum channel allowance time interval for Channel B. At time instance $TBTT_B$ 514 the wireless device switches from Channel A to Channel B without having reached the maximum channel allowance time interval for Channel A. The pattern now repeats.

In comparing FIG. 5 with FIG. 3, it is seen that the protocol represented in FIG. 5 more fairly distributes access to Channels A and B, yet still maintains the wireless device on the correct channel so as not to miss a scheduled Beacon frame at a TBTT.

Figure 6:
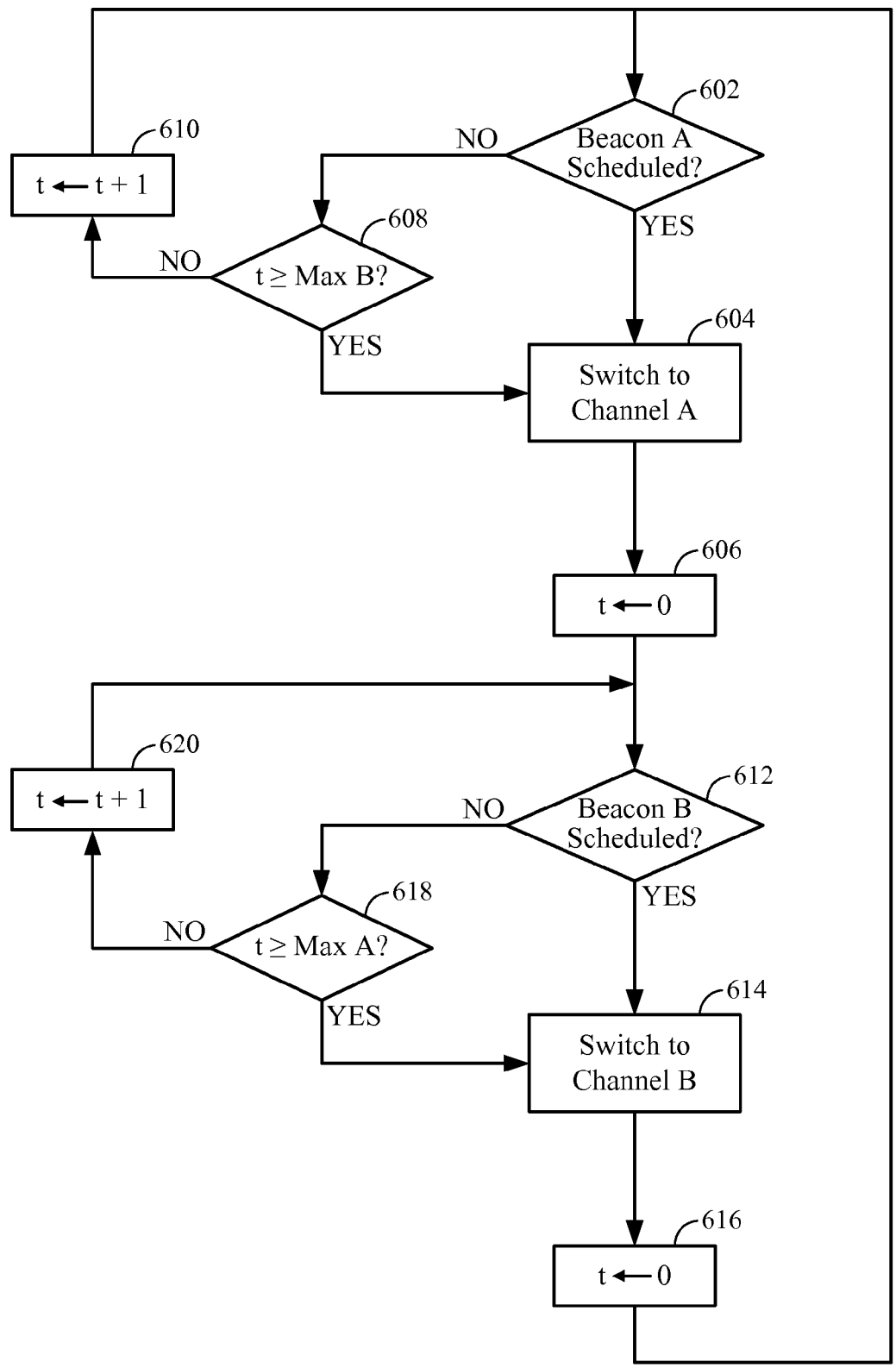
FIG. 6 is a flow diagram according to an embodiment for the particular case in which there are two channels.

FIG. 6 is a flow diagram according to an embodiment for the particular case in which there are two channels. Suppose a dual-channel wireless device is initially on Channel B. In 602, the wireless device determines whether a Beacon frame on Channel A is about to be transmitted. (It is assumed that the wireless device was initially in a listening mode to determine the Beacon intervals for the two channels and when the Beacon frames are scheduled for transmission.) In the determination of 602, the channel switching time is taken into account. If it is determined that a Beacon frame on Channel A is about to be scheduled, then the wireless device switches to Channel A (604) and a counter is set to zero (606). In FIG. 6, the value of the counter is denoted by the variable t.

If, however, it is determined in 602 that a beacon frame from Channel A is not about to be scheduled, then in 608 a determination is made as to whether the channel dwell time indicated by the counter is equal to or exceeds the maximum channel allowance time interval for Channel B. If the counter value is equal to or greater than the maximum channel allowance time interval for Channel B, then control of the flow diagram is brought to 604 to indicate that the wireless device switches to Channel A. If the counter value is less than the maximum channel allowance time interval for Channel B, Then the counter is incremented as indicated in 610 and control in the flow diagram is brought back to the determination 602. The real-time value of the counter value t depends upon the rate at which the counter is updated, it being understood that the comparison indicated by 608 is carried out in the correct time units.

When the wireless device has switched from Channel B to Channel A and has reset its counter, as indicated in 604 and 606, then in 612 a determination is made as to whether a Beacon frame on Channel B is about to be transmitted. In the determination of 612, the channel switching time is taken into account. If it is determined that a Beacon frame on Channel B is about to be scheduled, then the wireless device switches to Channel B (614) and the counter is set to zero (616).

If, however, it is determined in 612 that a beacon frame from Channel B is not about to be scheduled, then in 618 a determination is made as to whether the channel dwell time indicated by the counter is equal to or exceeds the maximum channel allowance time interval for Channel A. If the counter value is equal to or greater than the maximum channel allowance time interval for Channel A, then control of the flow diagram is brought to 614 to indicate that the wireless device switches to Channel B. If the counter value is less than the maximum channel allowance time interval for Channel A, then the counter is incremented as indicated in 620 and control in the flow diagram is brought back to the determination 612. It is understood that the comparison indicated by 618 is carried out in the correct time units.

Extending the protocol illustrated by the flow diagram of FIG. 6 to more than two channels is a simple matter. For example, for three channels, instead of control from the counter reset 616 going back to the determination of 602, it is brought to a new sequence of actions identical in structure to the combination of 612, 614, 616, 618, and 620, but where the counterpart to 618 involves a comparison with the maximum channel allowance time interval for the third channel. Control from the counterpart to 616 is then brought back to the determination of 602. Clearly, any arbitrary of channels may be handled by extending the flow diagram as just discussed.

Figure 7:
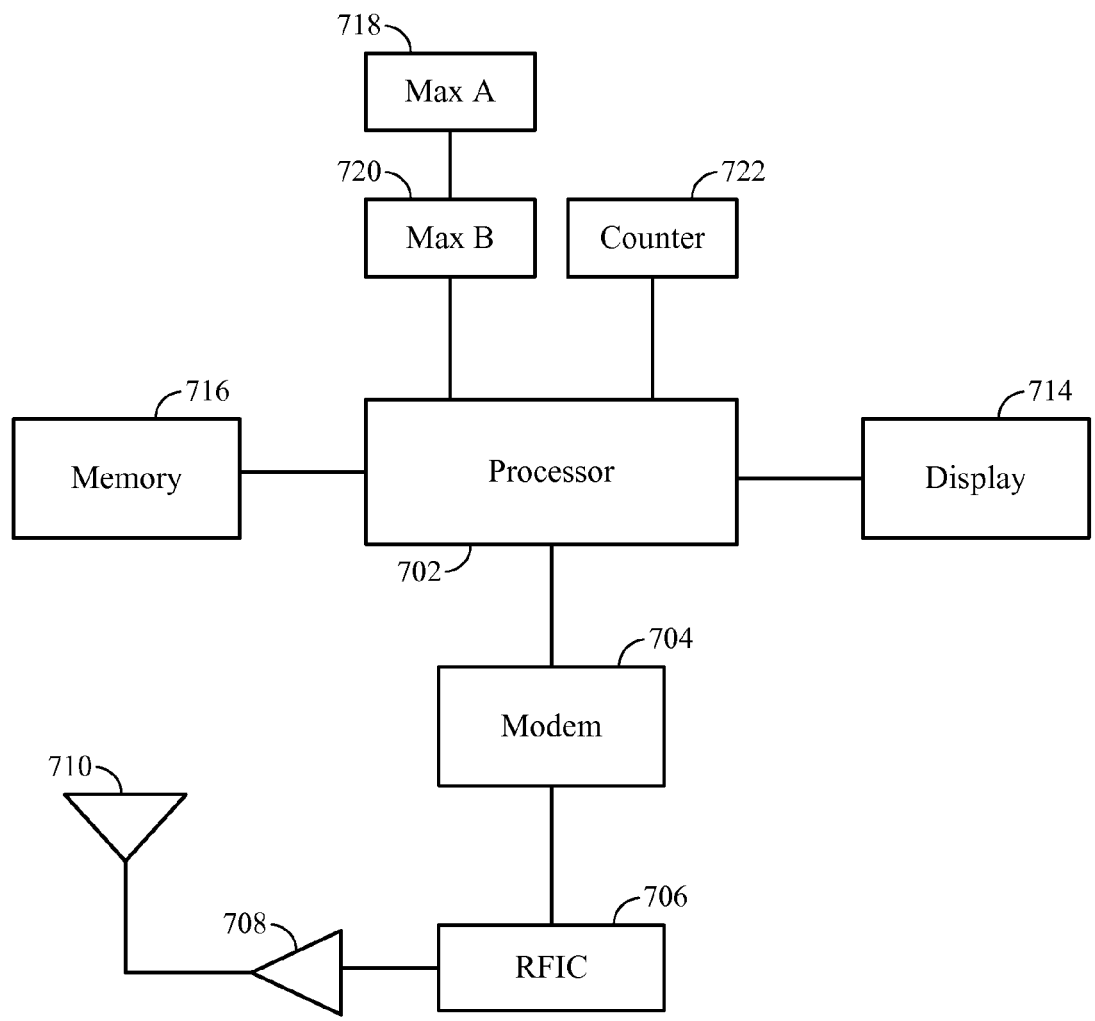
FIG. 7 illustrates a simplified abstraction of a wireless device according to an embodiment.

FIG. 7 illustrates a simplified abstraction of a wireless device according to an embodiment. Shown in FIG. 7 are Processor 702, Modem 704, Radio Frequency Integrated Circuit (RFIC) 706, Power Amplifier 708, Radio Frequency (RF) Antenna 710, Display 714, and Memory 716. For simplicity, not all components typically found in a wireless device are illustrated in FIG. 7. The maximum channel allowance time interval for Channels A and B are stored in registers 718 and 720. Counter 722 keeps the current value of t as discussed with respect to FIG. 6.

The operations indicated by the flow diagram of FIG. 6 may be represented by computer-readable instructions stored in Memory 716, wherein the instructions when executed by Processor 702 carry out the procedure indicated in FIG. 6. Accordingly, Memory 716 may be referred to as a computer-readable non-transitory medium.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for channel management in a Wi-Fi device in a multi-channel concurrent environment. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for a wireless device to switch from a first channel associated with a first network to a second channel associated with a second network in an environment of N total networks, the method comprising:

providing a first maximum channel allowance time interval given by a channel switching time subtracted from a first Beacon interval associated with the first network divided by N;

switching the wireless device from the first channel on the first network to the second channel on the second network when the wireless device determines that the second network is about to transmit a Beacon frame on the second channel; and switching the wireless device from the first channel on the first network to the second channel on the second network when the wireless device determines that a channel dwell time on the first channel is equal to or greater than the first maximum channel allowance time interval.

2. The method of claim 1, further comprising:

providing a second maximum channel allowance time interval given by the channel switching time subtracted from a second Beacon interval associated with the second network divided by N; and switching the wireless device from the second channel to a third channel associated with a third network if the wireless device has operated on the second channel for a channel dwell time equal to or greater than the second maximum channel allowance time interval.

3. The method of claim 2, further comprising:

switching the wireless device from the second channel to the third channel if the wireless device determines that the third network is about to transmit a Beacon frame associated with the third network.

4. The method of claim 1, wherein N=2, the method further comprising:

providing a second maximum channel allowance time interval given by the channel switching time subtracted from a second Beacon interval associated with the second network divided by N; and switching the wireless device from the second channel to the first channel if the wireless device has operated on the second channel for a channel dwell time equal to or greater than the second maximum channel allowance time interval.

5. The method of claim 4, further comprising:

switching the wireless device from the second channel to the first channel if the wireless device determines that the first network is about to transmit a Beacon frame associated with the first network.

6. The method of claim 1, wherein the N total networks are compliant with the Institute of Electrical and Electronics Engineers (IEEE) 802.11 set of standards.

7. A wireless device comprising:

a radio frequency circuit to operate on a first channel associated with a first network and a second channel associated with a second network in an environment of N total networks;

a counter; and a processor to run and reset the counter, wherein the processor resets the counter when causing the radio frequency circuit to switch channels;

the processor to provide a first maximum channel allowance time interval given by a channel switching time subtracted from a first Beacon interval associated with the first network divided by N; and the processor to switch the radio frequency circuit from the first channel to the second channel when the counter indicates that the radio frequency circuit has operated on the first channel for a channel dwell time equal to or greater than the first maximum channel allowance time interval.

8. The wireless device of claim 7, the processor to switch the radio frequency circuit from the first channel to the second channel if the processor determines that the second network is about to transmit a Beacon frame associated with the second network.

9. The wireless device of claim 7, the processor to
provide a second maximum channel allowance time interval given by the channel switching time subtracted from a second Beacon interval associated with the second network divided by N; and
switch the radio frequency circuit from the second channel to a third channel associated with a third network when the counter indicates that the radio frequency circuit has operated on the second channel for a channel dwell time equal to or greater than the second maximum channel allowance time interval.

10. The wireless device of claim 9,
the processor to switch the radio frequency circuit from the first channel to the second channel if the processor determines that the second network is about to transmit a Beacon frame associated with the second network;
the processor to switch the radio frequency circuit from the second channel to the third channel if the processor determines that the third network is about to transmit a Beacon frame associated with the third network.

11. The wireless device of claim 7, wherein N=2, the processor to
provide a second maximum channel allowance time interval given by the channel switching time subtracted from a second Beacon interval associated with the second network divided by N; and
switch the radio frequency circuit from the second channel to the first channel if the counter indicates that the radio frequency circuit has operated on the second channel for a channel dwell time equal to or greater than the second maximum channel allowance time interval.

12. The wireless device of claim 11,
the processor to switch the radio frequency circuit from the first channel to the second channel if the processor determines that the second network is about to transmit a Beacon frame associated with the second network;
the processor to switch the radio frequency circuit from the second channel to the first channel if the processor determines that the first network is about to transmit a Beacon frame associated with the first network.

13. The wireless device of claim 7, wherein the N total networks are compliant with the Institute of Electrical and Electronics Engineers (IEEE) 802.11 set of standards.

14. The wireless device of claim 7, wherein the wireless device is selected from the group consisting of a station, an access point, a Wi-Fi Direct client, and a cellular phone.

15. A wireless device comprising:
a radio frequency circuit to operate on a first channel associated with a first network and a second channel associated with a second network in an environment of N total networks;
a means for counting; and
a means for controlling to run and reset the means for counting, wherein the means for controlling resets the means for counting when causing the radio frequency circuit to switch channels;
the means for controlling to
provide a first maximum channel allowance time interval given by a channel switching time subtracted from a first Beacon interval associated with the first network divided by N; and
switch the radio frequency circuit from the first channel to the second channel when the means for counting indicates that the radio frequency circuit has operated on the first channel for a channel dwell time equal to or greater than the first maximum channel allowance time interval.

16. The wireless device of claim 15, the means for controlling to switch the radio frequency circuit from the first channel to the second channel if the means for controlling determines that the second network is about to transmit a Beacon frame associated with the second network.

17. The wireless device of claim 15, the means for controlling to
provide a second maximum channel allowance time interval given by the channel switching time subtracted from a second Beacon interval associated with the second network divided by N; and
switch the radio frequency circuit from the second channel to a third channel associated with a third network when the means for counting indicates that the radio frequency circuit has operated on the second channel for a channel dwell time equal to or greater than the second maximum channel allowance time interval.

18. The wireless device of claim 17,
the means for controlling to switch the radio frequency circuit from the first channel to the second channel if the means for controlling determines that the second network is about to transmit a Beacon frame associated with the second network;
the means for controlling to switch the radio frequency circuit from the second channel to the third channel if the means for controlling determines that the third network is about to transmit a Beacon frame associated with the third network.

19. The wireless device of claim 15, wherein N=2, the means for controlling to
provide a second maximum channel allowance time interval given by the channel switching time subtracted from a second Beacon interval associated with the second network divided by N; and
switch the radio frequency circuit from the second channel to the first channel if the means for counting indicates that the radio frequency circuit has operated on the second channel for a channel dwell time equal to or greater than the second maximum channel allowance time interval.

20. The wireless device of claim 19,
the means for controlling to switch the radio frequency circuit from the first channel to the second channel if the means for controlling determines that the second network is about to transmit a Beacon frame associated with the second network;
the means for controlling to switch the radio frequency circuit from the second channel to the first channel if the means for controlling determines that the first network is about to transmit a Beacon frame associated with the first network.

21. The wireless device of claim 15, wherein the N total networks are compliant with the Institute of Electrical and Electronics Engineers (IEEE) 802.11 set of standards.

22. The wireless device of claim 15, wherein the wireless device is selected from the group consisting of a station, an access point, a Wi-Fi Direct client, and a cellular phone.

23. A computer-readable non-transitory medium having stored instructions to cause a wireless device in an environment of N total networks to perform a method comprising:

providing a first maximum channel allowance time interval given by a channel switching time subtracted from a first Beacon interval associated with a first network divided by N;

switching from a first channel associated with the first network to a second channel associated with a second network when the wireless device determines that the second network is about to transmit a Beacon frame on the second channel; and switching from the first channel associated with the first network to the second channel associated with the second network when the wireless device determines that a channel dwell time is equal to or greater than the first maximum channel allowance time interval.

24. The computer-readable non-transitory medium of claim 23, the method further comprising:

providing a second maximum channel allowance time interval given by the channel switching time subtracted from a second Beacon interval associated with the second network divided by N; and switching the wireless device from the second channel to a third channel associated with a third network if the wireless device has operated on the second channel for a channel dwell time equal to or greater than the second maximum channel allowance time interval.

25. The computer-readable non-transitory medium of claim 24, the method further comprising:

switching the wireless device from the second channel to the third channel if the wireless device determines that the third network is about to transmit a Beacon frame associated with the third network.

26. The computer-readable non-transitory medium of claim 23, wherein N=2, the method further comprising:

providing a second maximum channel allowance time interval given by the channel switching time subtracted from a second Beacon interval associated with the second network divided by N; and switching the wireless device from the second channel to the first channel if the wireless device has operated on the second channel for a channel dwell time equal to or greater than the second maximum channel allowance time interval.

27. The computer-readable non-transitory medium of claim 26, the method further comprising:

switching the wireless device from the second channel to the first channel if the wireless device determines that the first network is about to transmit a Beacon frame associated with the first network.

28. The computer-readable non-transitory medium of claim 23, wherein the N total networks are compliant with the Institute of Electrical and Electronics Engineers (IEEE) 802.11 set of standards.

* * * * *